Figure 1:
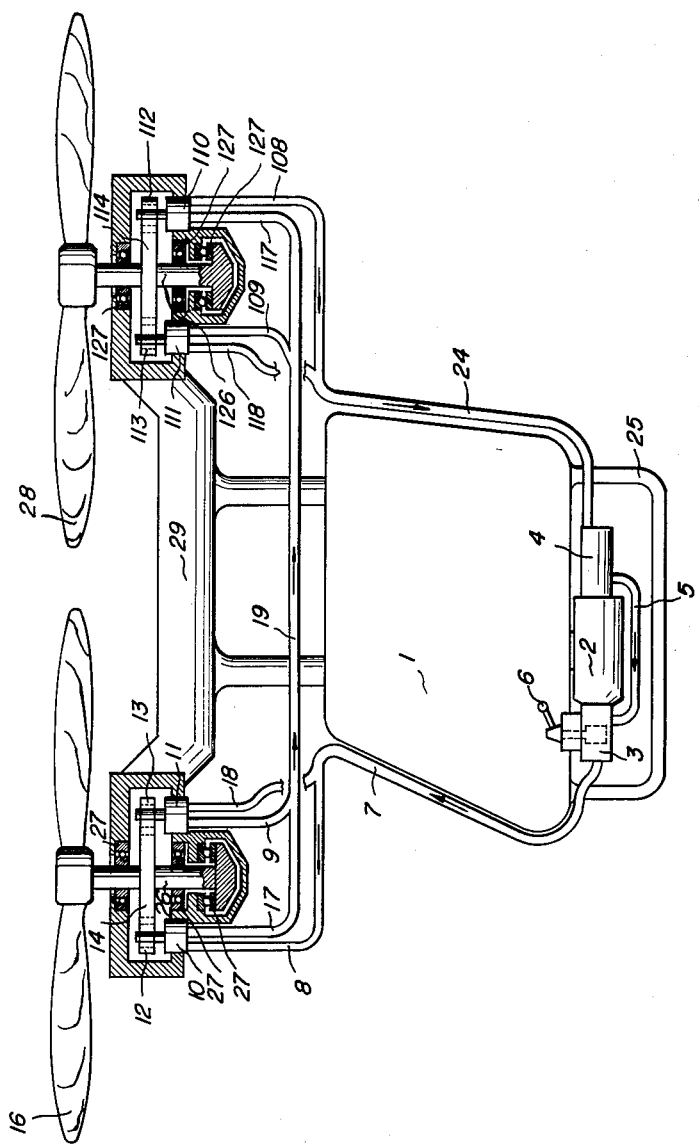

May 31, 1966 K. EICKMANN 3,253,807
HELICOPTER WITH TRANSMISSION
Filed May 20, 1964 2 Sheets-Sheet 1

INVENTOR.
KARL EICKMANN
BY
attorneys

May 31, 1966  K. EICKMANN  3,253,807
HELICOPTER WITH TRANSMISSION
Filed May 20, 1964  2 Sheets-Sheet 2

INVENTOR.
KARL EICKMANN

United States Patent Office 3,253,807
Patented May 31, 1966

3,253,807
HELICOPTER WITH TRANSMISSION
Karl Eickmann, 2420 Isshiki, Hayama-machi,
Kanagawa-ken, Japan
Filed May 20, 1964, Ser. No. 368,883
12 Claims. (Cl. 244—17.23)

This invention relates to helicopters which are operated by a hydraulic flow or flows wherein hydraulic motors drive a propeller. More in particular, this invention relates to such helicopters wherein a plurality of hydraulic motors are driving one of the propellers of the helicopter.

This invention relates in general to fluid borne vehicle drives and in particular to a new and useful closed circuit fluid drive for vehicles such as helicopters and the like.

It is already proposed to drive helicopters by hydraulic motors which are driven by flows of hydraulic fluid under pressure. The intention of this invention is to improve such hydraulic operated helicopters.

If the propeller of a helicopter is driven by a hydraulic motor, then it must be intended that the weight of the propeller and the hydraulic motor together, becomes as small as possible, in order to make the aircraft as light as possible and thereby to make the aircraft rational to operate.

Thereby, arises the difficulty, a large diameter propeller can be rotated only with a limited rotary velocity, because in the case of high rotary velocity, large diameter propellers reach the speed of sound on the radial outer ends of the propellers and therefore become inefficient. On the other hand, if the hydraulic motor revolves at a slower speed, for instance, with such revolution as the propeller shall rotate, then the hydraulic motor needs a certain amount of weight in order to be able to provide the moment and the power which is needed by the propeller to rotate at the desired speed.

Large weight hydraulic motors on the other hand, make the weight of the helicopter too heavy and reduce the lifting and bearing capacity of the respective helicopter.

It is therefore an object of this invention to provide hydraulic motors for driving the helicopter propellers, which are lighter in weight.

In order to realize this object of the invention, small size hydraulic motors, which are revolving with a high rotary velocity and which are therefore less in weight, are used. The shaft of the propeller is provided with a main gear and a plurality of high speed hydraulic motors are provided with small gears for engagement with the main gear, in order to drive the main gear of the propeller shaft.

A plurality of small size high revolution hydraulic motors are therefore set on the periphery of the main gear and they are placed in such a way, respective to the main gear, that they balance each other.

Another object of the invention is to provide a plurality of flows for driving the hydraulic motors of this invention, or to divide a flow of fluid into twin-flows or a plurality of flows so that each of the twin flows or divided flows enters each one of the hydraulic motors.

Another object of the invention is to provide a variable pump on a power plant or combustion engine or turbine in order that the flow quantity adjustment controller of the pump can vary the speed of the driving hydraulic motors and thereby the rotary velocity of the propeller or propellers of the aircraft.

Furthermore, in heretofore known helicopters, if they are hydraulically driven, it is possible that a hydraulic pipe, pump, or motor breaks which would cause the helicopter to crash.

Such disadvantages of earlier helicopters can be overcome by driving the helicopters by two-flows of hydraulic fluid with a substantial equal or parallel flow delivery quantity.

For this purpose the power plant or engine drives one two-flow pump or two pumps with equal delivery or a plurality of engines are driving a plurality of two-flow pumps and each of the two-flow pumps delivers one flow into one delivery tube and the other flow into another delivery tube. The one delivery tube then passes the flow of fluid to one of the plurality of hydraulic motors for driving one propeller while the other flow of fluid is passed to the other hydraulic motor which drives the same propeller. Thereafter, both flows may flow separately to other oil motors for driving another propeller or other propellers, or they may flow back to the tank or fluid flow producing device or to the two-flow pump.

Thereby, if one of the delivery tubes or medial tubes or return flow tubes of the circuit breaks or leaks, then the other delivery tube or the other flow of fluid may remain intact and continue to drive the other oil motor or hydraulic motor which then continues to drive the main gear or transmission of the respective propeller or propellers.

It is therefore another important object of this invention to provide a helicopter which has two pumps or a two-flow pump or a fluid flow producing device for producing two separated flows of fluid which flow through separated passages to separated hydraulic motors and wherein the two separated hydraulic motors drive one propeller or a plurality of propellers directly or indirectly via the transmission means which drives the shaft of the propeller.

More objects, features, and details of the invention will become apparent from the accompanying drawing and from study of the description thereof.

Figure 2:
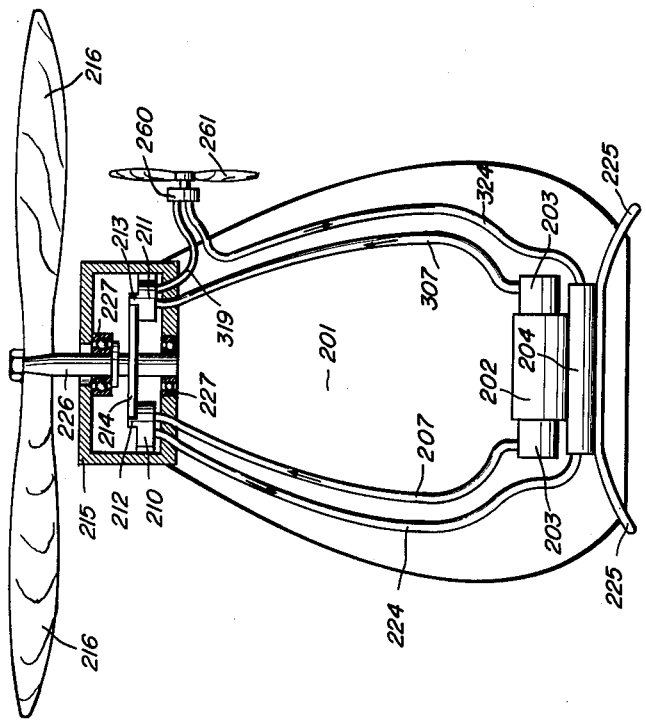

FIG. 1 is a partial elevational and partial sectional view of an embodiment of a simplified helicopter, constructed according to this invention; and FIG. 2 is a view similar to FIG. 1 of another embodiment of the invention.

In FIG. 1, position 1 represents the cabin or body of the helicopter. The power plant, which might be a combustion engine, a gas turbine, or the like 2, drives a variable output oil hydraulic pump 3. The variable output oil hydraulic pump 3 is provided with an adjustment controller 6 by which the delivery quantity of hydraulic pump 3 can be increased and decreased. Tank 4 is also provided on the helicopter and contains the hydraulic fluid which is passed through the hydraulic fluid supply tube or pipe 5 and into the variable hydraulic pump 3. The adjustment controller 6 of the hydraulic pump 3 can vary the displacement of the pumping chambers inside of the pump 3, so that each pumping chamber during one revolution, pumps a larger or smaller quantity of hydraulic fluid into the delivery pipe 7.

The delivery pipe 7 extends along the body of the helicopter and divides into the delivery twin pipes so that the first twin pipe 8 leads to hydraulic motor 10 while the second twin pipe 9 leads to the hydraulic motor 11.

Hydraulic motor 10 is the first hydraulic motor while hydraulic motor 11 is the second hydraulic motor and each of the hydraulic motors 10 and 11 is provided with a gear on its shaft. First gear 12 is fastened on the shaft of the first hydraulic motor 10 and engages in the main gear 10. Second gear 13 is fastened on the shaft of the second hydraulic motor 11 and engages also in the main gear 14. The first hydraulic motor 10 and the second hydraulic motor 11 with the first gear 12 and the second gear 13 respectively are located diametrically opposite in respect to the axis of the propeller shaft 26. The propeller shaft 26 carries the first propeller 16 and propeller shaft 26 is carried in a bearing or a plurality of bearings 27. The bearings 27 are fastened inside of a gear housing or container 15. The gear housing or container 15 may be fastened by arms, plates, bars or the like, to the respective pipes of the helicopter or to the body 1 or cabin 1 of the helicopter.

The first twin return pipe 17 extends from the first hydraulic motor 10 into the medial pipe 19, while the second twin return pipe 18 extends from the second hydraulic motor 11 into the medial pipe 19. Therefrom, it appears that the first twin return 17 and the second twin return pipe 18 extend into the same pipe, the medial pipe 19.

A second propeller 22 is mounted in cabin 1 opposite the first propeller 16. The second propeller 28 is provided on propeller shaft 126.

Propeller shaft 126 is borne in a bearing or a plurality of bearings 127 which are carried in the gear casing or container 115. The main gear 114 is provided on propeller shaft 126.

The third hydraulic motor 110 is carried in container 15 and has a third gear 112 on its shaft which engages in the main gear 114. The fourth hydraulic motor 111 is also carried in the gear case or container 115 and carries the fourth gear 113 on its shaft which engages with the main gear 114. Shortly before the hydraulic motor 110 and 111, the medial pipe 19 divided into the third twin pipe 108 and the fourth twin pipe 109. The third twin pipe 108 leads to the third hydraulic motor 110 while the fourth twin pipe 109 goes to the fourth hydraulic motor 111. From the third hydraulic motor 110 twin return pipe 117 extends to the return pipe 24 and from the fourth hydraulic motor 111 it extends to the return pipe 24. Return pipe 24 extends along the helicopter body to the tank 4. Helicopter feet 25 may be provided on the helicopter so that the helicopter may rest on the ground.

Instead of one medial pipe or passage 19, there could also be two medial passages 19, so that twin passages 17, 18, 108 and 109 can be spared.

Before starting the helicopter, it is convenient to set the delivery quantity of the variable pump 3 by pump adjustment controller 6 into zero position. Then the variable pump 3 does not deliver when the rotor in the pump revolves. After the power plant, engine or turbine 2, is started it is adjusted to its normal working rotary velocity.

For take off, the delivery quantity of the variable pump 3 becomes gradually increased by adjusting the displacement of the pump chambers therein by the pump adjustment controller 6. As the pump 3 becomes adjusted to a higher delivery quantity, the more rapidly are the propellers rotated until the propellers reach the speed which is enough to lift the helicopter into the air. Also during the flight or during the setting down or landing of the helicopter and taking off of the helicopter the speed of the propellers becomes controlled by the pump adjustment controller 6 of the pump 3. As the delivery quantity of the pump 3 becomes adjusted down, the propellers slow down to cause the helicopter to set down. The variable output pump 3 may, for example, be of a type shown and described in applicant's copending application Serial No. 368,820 filed May 20, 1964.

During operation of the helicopter, a flow of hydraulic fluid flows out from the variable pump 3 with a pressure P3 through the delivery pipe or delivery tube 7. A part of the wole delivery quantity of the variable pump 3 flows from the delivery tube 7 into the first twin pipe 8 while another part flows into the second twin pipe 9. The quantity of flow which flows into the first twin pipe 8 and into the second twin pipe 9 is substantially equal but it can be slightly different, depending on the volumetric efficiency and tightness of the respective hydraulic motors. The flow of fluid under pressure P3 which enters into the first hydraulic motors 10 forces the hydraulic motor 10 for rotation while the flow of fluid also with pressure P3 of the second twin pipe 9 forces the motor 11 to rotate.

During revolution, the first gear 12 on the shaft of first hydraulic motor 10 as well as the second gear 13 on the shaft of second hydraulic motor 11 are engaging with the main gear 14 and they are driving the main gear 14 and thereby the propeller shaft 26 and propeller 16 thereon. A transmission is preferably present between the first gear 12 and the main gear 14 as well as the second gear 13 and the main gear 14. Therefore, it is possible that the hydraulic motors 10 and 11 can revolve at a higher rotary velocity than the propeller shaft 26 and propeller 16 rotate. This transmission makes it possible that the hydraulic motors can be constructed of smaller size, and thereby be of less weight and of lower costs. The first hydraulic motor 10 and the second hydraulic motor 11 with the first gear 12 and the second gear 13 are arranged in opposition on the shaft 28. Therefore, the radial and tangential forces which are acting from the first gear 12 and second gear 13 on the main gear 14 are balancing each other.

Thereby, lateral forces on the main gear 14 and propeller 26 are prevented which makes a relative frictionless floating of the propeller shaft 26 between the first gear 12 and second gear 13 possible. Forces which might force the gear shaft 26 out of its center position are thereby prevented.

Instead of providing two hydraulic motors 10 and 11 and two gears 12 and 13 for driving the main gear 14 on the gear shaft 26 it would also be possible to provide another plurality of hydraulic motors and hydraulic gears, for instance three, four or the like, depending on the situation. It is convenient to provide a plurality of hydraulic motors with gears on the shaft thereof, in such a way around the main gear 14 that the tangential and radial forces which act on the main gear 14 the balancing each other.

Another feature can be obtained where instead of constant displacement hydraulic motors, such hydraulic motors are supplied which have an adjustment device for varying the displacement volume of the working chambers in the hydraulic motors. Thereby, it becomes possible by means of changing the displacement volume of several hydraulic motors to change the rotary velocity of the respective propeller. That can be utilized for the control of the movement of the helicopter.

Assuming now that one or the other of the hydraulic motors would have a slightly different efficiency or that the hydraulic motors would be of different volumetric efficiency or that the leakage losses of the hydraulic motors are different. Then a somewhat larger quantity of hydraulic fluid flows to that motor with the bigger volumetric losses so that both motors in practical use rotate with the same rotary velocity and both hydraulic motors 10 and 11 provide substantially the same moment to the main gear 14 and thereby to the propeller shaft 26, regardless if they are of exactly the same volumetric efficiency and if they have the same tightness or not.

From the first hydraulic motor 10 returns the hydraulic flow with a medial pressure into the medial pipe 19 and from the second hydraulic motor 11 the flow of hydraulic fluid with the medial pressure returns into the medial pipe 19. Out of medial pipe 19 the flow of fluid may divide again into two twin flows which drive the third and the fourth hydraulic motor 110 and 111 and thereby the third and fourth gears 112 and 113. Thereby the main gear 114 of propeller shaft 126 of the second propeller 28 is forced to rotate. The cooperation of the parts and means which drive the second propeller 28 are similar to those which drive the first propeller 16. Out from the third hydraulic motor 110 returns the flow of fluid with the pressure P1 through the twin return pipe 108 into the return pipe 24 while the other part of the flow of fluid returns from the fourth hydraulic motor 111 through the fourth twin return pipe 118 into the return pipe 24 also if the pressure P1 which is substantially present in the whole return pipe 24.

The pressure P1 may be equal to atmospheric pressure or only somewhat higher than atmospheric pressure or may be of several atmospheres only. The pressure P3 in the delivery pipe 7 is substantially two times higher than the pressure P2 in the medial pipe 19 plus the return pressure P1. For example, in practically built helicopters of the invention, the pressure P3 may be 4,040 p.s.i. the pressure P2 may be 2,040 p.s.i. and the return pressure P1 may be 40 p.s.i. But these pressures are by way of example only and they are mentioned only in order to give an impression about the pressure which may act in the hydraulic system in the helicopter.

In FIG. 2 position 201 shows the body or cabin of another embodiment of the helicopter of this invention. By position 225 the feet of the helicopter are demonstrated. The engines or power plant 202 drive a two-flow pump or as demonstrated in this embodiment, two separated hydraulic pumps 203 and 303; each one on one end of the engine driven by the same shaft of the engine or power plant 202. Both pumps 203 and 303, in this case, have the same delivery quantity so that both are delivering the same or substantially the same quantity of flow of fluid.

From pump 203 the fluid flows under pressure through the delivery tube 207 to the first hydraulic motor 210. After the work is done, it leaves the first hydraulic motor 210 and returns through the return flow pipe 224 into the tank 204. The second flow of hydraulic fluid flows from the pump 303 through the second flow delivery tube 307 to the second hydraulic motor 211 and drives the motor. After the work is done it leaves the second hydraulic motor 211 and flows through the medial pipe 319 to a third hydraulic motor which is shown by position 260 and which drives a control or adjustment propeller 261. The second flow leaves then the second motor 260 and flows through the return pipe 324 back into the tank 204.

Each of the hydraulic motors 210 and 211 has a gear 212 or 213. Both gears 212 and 213 are on respective shaft of the respective hydraulic motor and both are engaging the main gear 214 which is fastened on the propeller shaft 226. Propeller 216 is fastened on propeller shaft 226 and if the propeller shaft 226 revolves, then also the propeller 216 rotates. Propeller shaft 226 is borne on bearings 227 and the bearings 227 are located in and borne by a container or gear casing 215 which is fastened on the body 201 of the helicopter of this embodiment.

Therefore, both pumps 203, and 303 are driving each one hydraulic motor 210 and 211 and each of the hydraulic motors is engaged in driving the main gear 214 of the main propeller 216. Both flows have about the same delivery quantity and the same pressure so that both are driving together the propeller 216.

The feature of this embodiment of the invention is, that if one of the delivery tubes breaks, the other delivery tube then can continue to deliver a flow of fluid. If one of the delivery tubes 207 or 307 is broken then one of the hydraulic motors 210 or 211 does not receive fluid under pressure and is therefore not able to supply a driving force into the main gear 214. But the other motor which still remains intact gets still continually fluid under pressure out of the other flow of fluid from the other pump and therefore the only one hydraulic motor then drives the main gear 214 while the other hydraulic motor then may continue its rotation, while engaged with the main gear, but without power.

Therefore, the one flow of hydraulic fluid is able to drive the propeller 214 at least for a limited time, so that the helicopter can be set for a safe or emergency landing or even that the helicopter can continue its flight with only one hydraulic motor and with only one hydraulic fluid flow in action.

As already said, instead of providing two separated hydraulic pumps 203 and 303 on both ends of the engine or power plant 202 it would also be possible to provide a two-flow pump on one end of the engine 202 or to produce two flows of fluid in the fluid flow producing device 202, as described in my copending application Serial No. 368,820 filed May 20, 1964.

As far as parts of the helicopter of this invention were called pipes, they may also be passages or flexible tubes, depending on the design consideration or on the actual situation.

Between the gear case or container 15 and the other gear case or container 115 may the frame 29 be provided in order to keep both together and the body of the helicopter as well as the other parts of the helicopter may be borne on the said frame 29. That is a special convenience, if instead of pipes, flexible tubes are used for the passing of the flow of fluid or flows of fluid therethrough.

While the helicopter of the figure has two propellers, it is also possible to provide a plurality of more propellers connected in series, or also to drive the helicopter by two or more hydraulic flows. Also if the helicopter has only one lifting or bearing propeller, such propeller can be driven by the motor passages and gears of this invention. The stabilizing propeller or propellers preferably those on the back of the helicopter can also be driven by the means of this invention as well as horizontal driving propellers can be.

As far as a helicopter is mentioned in this specification, or in the appended claims, that expression shall include helicopters or air-cushion vehicles which move or rest in a limited height over the surface of land or water, so that a ground effect or an air-cushion effect of the air stream or streams through the propeller or propellers is utilized.

In the figures and the description thereof is an embodiment of the invention demonstrated. But it is possible to do modifications or to build other embodiments of the invention without leaving the scope of the invention and it is therefore desired that the patent shall not be limited to the embodiment demonstrated in this specification but shall be covered by the appended claims.

What is claimed is:

1. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, liquid flow producing means, delivery conduit means connected to said liquid flow producing means and each of said fluid motors for actuating said motors by flow therethrough, and return conduit means connected between each of said motors and said liquid flow producing means.

2. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft each having a motor shaft, gear means as well as all of said motors, liquid flow producing means comprising at least one driving motor and at least one driven pump driven by said motor, delivery conduit means connected to said liquid flow producing means and each of said fluid motors for actuating said motors by flow therethrough, and return conduit means connected between each of said motors and said liquid flow producing means.

3. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, liquid flow producing means, delivery conduit means connected to said liquid flow producing means and each of said fluid motors for actuating said motors by flow therethrough, and return conduit means connected between each of said motors and said liquid flow producing means, said liquid flow producing means comprising a driving motor, a plurality of pumps connected to said driving motor for operation by said motor, said pumps being separately connected through said delivery conduit means to a respective one of said motors.

4. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, said gear means comprising a relatively large sized diameter gear connected to said rotor shaft and a pinion on each of said motor shafts in driving engagement with said gear, liquid flow producing means, delivery conduit means connected to said liquid flow producing means and each of said fluid motors for actuating said motors by flow therethrough, and return conduit means connected between each of said motors and said liquid flow producing means.

5. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, liquid flow producing means, delivery conduit means connected to said liquid flow producing means and each of said fluid motors for actuating said motors by flow therethrough, said delivery conduit means including a delivery pipe connected to said fluid flow producing means, and twin delivery pipes connected to said delivery pipe and to each respective motor, and return conduit means connected between each of said motors and said liquid flow producing means.

6. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, liquid flow producing means, delivery conduit means connected to said liquid flow producing means and each of said fluid motors for actuating said motors by flow therethrough, and return conduit means connected between each of said motors and said liquid flow producing means, said fluid flow producing means including a plurality of pumps, said delivery conduit means including a separate delivery conduit connected from each pump to a respective motor.

7. A fluid borne vehicle including a body, at least one lift rotor having a rotor shaft rotatably mounted on said body for rotation about a substantially vertical axis, a plurality of positive displacement fluid motors adjacent said rotor shaft each having a motor shaft, gear means coupling each motor shaft to said rotor shaft for rotating said rotor shaft upon actuation of each one of said motors as well as all of said motors, fluid flow producing means including a plurality of pumps, a delivery conduit connected from said fluid flow producing means to each of said fluid motors for actuating said motors by flow therethrough, and return conduit means connected between each of said motors and said fluid flow producing means, a control propeller having a control shaft which is mounted for rotation on said body about a substantially horizontal axis, a control fluid motor connected to said control shaft for rotating said control shaft and being connected to said fluid flow producing means and to said return conduit means for receiving a flow of fluid from said fluid flow producing means and directing it to said return conduit means for rotating said control fluid motor and driving said control propeller.

8. A helicopter comprising a body, first and second lift rotors, first and second rotor shafts secured respectively to said first and second rotors and rotatably mounted at respective locations adjacent two opposite extremities of said body for rotation about respective substantially vertical axes, first and second positive displacement fluid motors located adjacent each of said first and second rotor shafts, a large diameter gear secured to each of said first and second rotor shafts, each of said first and second fluid motors associated with respective first and second rotors having a shaft with a driving pinion thereon engaged with said large diameter gear for rotating the associated rotor shaft upon actuation of said fluid motor, pump means, a fluid delivery conduit connected to said pump means and having a branch going to each of said first and second fluid motors of said first rotor, medial conduit means connected between said first and second fluid motors of said first rotor and said first and second fluid motors of said second rotor for delivering actuating fluid to said first and second fluid motor of said second rotor from said first and second fluid motors of said first rotor, and return conduit means connecting said first and second fluid motors of said second rotor to said pump means.

9. A helicopter according to claim 8, wherein said pump means includes at least one variable displacement pump.

10. A helicopter according to claim 8, wherein said pump means includes a variable displacement pump.

11. A helicopter comprising a body, first and second lift rotors, first and second rotor shafts secured respectively to said first and second rotors and rotatably mounted at respective locations adjacent two opposite extremities of said body for rotation about respective substantially vertical axes, first and second positive displacement fluid motors located adjacent each of said first and second rotor shafts, a large diameter gear secured to each of said first and second rotor shafts, each of said first and second fluid motors associated with respective first and second rotors having a shaft with a driving pinion thereon engaged with said large diameter gear for rotating the associated rotor shaft upon actuation of said fluid motor, pump means, a fluid delivery conduit connected to said pump means and having a branch going to each of said first and second fluid motors of said first rotor, medial conduit means connected between said first and second fluid motors of said first rotor and said first and second fluid motors of said second rotor for delivering actuating fluid to said first and second fluid motor of said second rotor from said first and second fluid motors of said first rotor, return conduit means connecting said first and second fluid motors of said second rotor to said pump means, and a single driving engine connected to said pump means.

12. A helicopter comprising a body, first and second lift rotors, first and second rotor shafts secured respectively to said first and second rotors and rotatably mounted at respective locations adjacent two opposite extremities of said body for rotation about respective substantially vertical axes, first and second positive displacement fluid motors located adjacent each of said first and second rotor shafts, a large diameter gear secured to each of said first and second rotor shafts, each of said first and second fluid motors associated with respective first and second rotors having a shaft with a driving pinion thereon engaged with said large diameter gear for rotating the associated rotor shaft upon actuation of said fluid motor, pump means, a fluid delivery conduit connected to said pump means and having a branch going to each of said first and second fluid motors of said first rotor, medial conduit means connected between said first and second fluid motors of said first rotor and said first and second fluid motors of said second rotor for delivering actuating fluid to said first and second fluid motor of said second rotor from said first and second fluid motors of said first rotor, return conduit means connecting said first and second fluid motors of said second rotor to said pump means, said pump means comprising a driving engine, and a variable output pump connected to said engine and driven thereby, and a pump control for varying the output of said pump.

References Cited by the Examiner

UNITED STATES PATENTS

| | | | |
|---|---|---|---|
| 2,297,400 | 9/1942 | Friedrich | 170—135.7 X |
| 2,301,098 | 10/1942 | Twyman | 60—97 |
| 2,514,822 | 7/1950 | Wolfe | 170—135.7 X |
| 2,541,292 | 2/1951 | Robinson | 60—19 X |
| 2,944,609 | 7/1960 | Sikorsky | 170—135.7 X |
| 3,106,260 | 10/1963 | Bollum | 180—7 |

MARK NEWMAN, *Primary Examiner.*

JULIUS E. WEST, *Examiner.*

W. E. BURNS, *Assistant Examiner.*